(12) United States Patent
Haller

(10) Patent No.: US 9,994,239 B2
(45) Date of Patent: Jun. 12, 2018

(54) VEHICLE WITH FORCE-CONTROLLED SHOCK ABSORBER (2-PIPE SHOCK ABSORBER)

(71) Applicant: GRAMMER AG, Amberg (DE)

(72) Inventor: Erwin Haller, Birgland (DE)

(73) Assignee: GRAMMER AG, Amberg (DE)

( * ) Notice: Subject to any disclaimer, the term of this patent is extended or adjusted under 35 U.S.C. 154(b) by 126 days.

(21) Appl. No.: 15/025,969

(22) PCT Filed: Sep. 25, 2014

(86) PCT No.: PCT/EP2014/070495
§ 371 (c)(1),
(2) Date: Jul. 8, 2016

(87) PCT Pub. No.: WO2015/049156
PCT Pub. Date: Apr. 9, 2015

(65) Prior Publication Data
US 2016/0311446 A1  Oct. 27, 2016

(30) Foreign Application Priority Data

Oct. 1, 2013  (DE) ......................... 10 2013 110 920

(51) Int. Cl.
*B61D 33/00* (2006.01)
*B60N 2/50* (2006.01)
(Continued)

(52) U.S. Cl.
CPC ......... *B61D 33/0078* (2013.01); *B60G 13/00* (2013.01); *B60G 13/08* (2013.01);
(Continued)

(58) Field of Classification Search
CPC .... B61D 33/0078; B60G 13/00; B60G 13/08; B60G 99/002; B60N 2/505; B60N 2/522;
(Continued)

(56) References Cited

U.S. PATENT DOCUMENTS 1,908,902 A   5/1933  Knoll
2,346,895 A   4/1944  Bergman
(Continued)

FOREIGN PATENT DOCUMENTS

CA   2961697 A1 *  3/2016  ................ B61F 5/24
CH   138281           2/1930
(Continued)

OTHER PUBLICATIONS

International Preliminary Report on Patentability for International (PCT) Patent Application No. PCT/EP2014/070495, dated Apr. 14, 2016, 6 pages.
(Continued)

*Primary Examiner* — Melanie Torres Williams
(74) *Attorney, Agent, or Firm* — Sheridan Ross P.C.

(57) ABSTRACT

The invention relates to a shock absorber with a housing, an inner pipe arranged in the housing, a piston rod, a piston which is arranged at that end of the piston rod, and which piston divides the interior of the inner pipe into a lower chamber and an upper chamber, a first valve arrangement which is arranged on the piston, and a third valve arrangement which is arranged at the lower end of the inner pipe and by means of which the working medium which is held in the interior of the housing, serving as a tank, can flow out of the interior of the housing, only into the lower chamber when the piston moves in the inner pipe. The shock absorber is distinguished by the fact that a hydraulic pump drive is arranged between a first connection element of the lower chamber of the inner pipe and a second connection element at the upper chamber of the inner pipe.

17 Claims, 6 Drawing Sheets

(51) Int. Cl.

| | | |
|---|---|---|
| *B60N 2/52* | (2006.01) | |
| *B60G 13/00* | (2006.01) | |
| *B60G 99/00* | (2010.01) | |
| *B60G 13/08* | (2006.01) | |
| *B60G 17/08* | (2006.01) | |
| *B61F 5/30* | (2006.01) | |
| *B61F 5/50* | (2006.01) | |
| *B62D 33/06* | (2006.01) | |
| *F16F 9/18* | (2006.01) | |
| *F16F 9/46* | (2006.01) | |

(52) U.S. Cl.
CPC .......... *B60G 17/08* (2013.01); *B60G 99/002* (2013.01); *B60N 2/505* (2013.01); *B60N 2/522* (2013.01); *B60N 2/527* (2013.01); *B61F 5/308* (2013.01); *B61F 5/50* (2013.01); *B62D 33/0604* (2013.01); *F16F 9/187* (2013.01); *F16F 9/46* (2013.01); *B60G 2202/24* (2013.01); *B60G 2202/413* (2013.01); *B60G 2202/416* (2013.01); *B60G 2500/10* (2013.01); *B60G 2500/11* (2013.01); *B60G 2500/30* (2013.01)

(58) Field of Classification Search
CPC ..... B60N 2/527; B61F 5/308; B62D 33/0604; F16F 9/187; F16F 9/46
See application file for complete search history.

(56) References Cited

U.S. PATENT DOCUMENTS

| | | | |
|---|---|---|---|
| 2,660,222 A | 11/1953 | Woodsworth | |
| 2,725,078 A | 11/1955 | Glancy | |
| 3,148,869 A | 9/1964 | Peterson | |
| 3,269,774 A | 8/1966 | Friedhelm | |
| 3,470,692 A | 10/1969 | Kamp | |
| 3,480,293 A | 11/1969 | Vogel et al. | |
| 3,596,895 A | 8/1971 | Hirtreiter | |
| 3,732,944 A | 5/1973 | Kendall | |
| 3,806,191 A | 4/1974 | Stegmaier | |
| 3,938,770 A | 2/1976 | Turner et al. | |
| 4,087,069 A | 5/1978 | Hall et al. | |
| 4,139,186 A | 2/1979 | Postema et al. | |
| 4,418,955 A | 12/1983 | Muncke et al. | |
| 4,497,078 A | 2/1985 | Vogel et al. | |
| 4,502,673 A | 3/1985 | Clark | |
| 4,526,258 A | 7/1985 | Huber | |
| 4,531,761 A | 7/1985 | von Sivers | |
| 4,655,440 A | 4/1987 | Eckert | |
| 4,733,847 A | 3/1988 | Grassl | |
| 4,743,000 A | 5/1988 | Karnopp | |
| 4,936,423 A | 6/1990 | Karnopp | |
| 5,082,309 A * | 1/1992 | Schutzner | B60G 17/0152 280/5.507 |
| 5,169,112 A | 12/1992 | Boyles et al. | |
| 5,222,759 A | 6/1993 | Wanner et al. | |
| 5,263,559 A | 11/1993 | Mettner | |
| 5,273,240 A | 12/1993 | Sharon | |
| 5,290,089 A | 3/1994 | Oleszko et al. | |
| 5,294,085 A | 3/1994 | Llloyd et al. | |
| 5,538,117 A | 7/1996 | Bouchez | |
| 5,685,603 A | 11/1997 | Lane, Jr. | |
| 5,836,647 A | 11/1998 | Turman | |
| 5,871,257 A | 2/1999 | Dundes, Sr. | |
| 5,876,085 A | 3/1999 | Hill | |
| 6,120,082 A * | 9/2000 | Vandermolen | B60N 2/02 248/550 |
| 6,467,748 B1 | 10/2002 | Schick et al. | |
| 6,494,441 B2 | 12/2002 | Beck et al. | |
| 6,857,674 B2 | 2/2005 | Chareyre | |
| 7,246,836 B2 | 7/2007 | Hahn | |
| 7,290,834 B2 | 11/2007 | Christopher | |
| 7,341,645 B2 | 3/2008 | Fong | |
| 7,568,675 B2 | 8/2009 | Catton | |
| 7,635,051 B2 | 12/2009 | Beck | |
| 7,699,147 B2 | 4/2010 | Preukschat et al. | |
| 7,779,974 B2 | 8/2010 | Timoney et al. | |
| 8,091,964 B2 | 1/2012 | Carter et al. | |
| 8,112,198 B2 | 2/2012 | Parison, Jr. et al. | |
| 8,118,287 B2 | 2/2012 | Schordine | |
| 8,146,897 B2 | 4/2012 | Beck | |
| 8,256,842 B2 | 9/2012 | Himmelhuber et al. | |
| 8,342,541 B2 | 1/2013 | Wurmthaler et al. | |
| 8,439,420 B2 | 5/2013 | Cantor et al. | |
| 8,573,606 B1 * | 11/2013 | Kim | B60G 13/08 267/64.17 |
| 8,585,004 B1 | 11/2013 | Roeglin et al. | |
| 8,632,061 B2 | 1/2014 | Nemoto | |
| 8,776,961 B2 | 7/2014 | Mori et al. | |
| 8,820,064 B2 | 9/2014 | Six et al. | |
| 8,998,325 B2 | 4/2015 | Jonsson | |
| 9,120,410 B2 | 9/2015 | Bauman | |
| 9,140,328 B2 | 9/2015 | Lorey | |
| 9,248,768 B2 | 2/2016 | Kolb | |
| 9,260,011 B2 | 2/2016 | Anderson et al. | |
| 9,266,453 B2 | 2/2016 | Haller et al. | |
| 9,481,221 B2 | 11/2016 | Reybrouck | |
| 9,597,939 B2 | 3/2017 | Anderson et al. | |
| 2001/0015565 A1 | 8/2001 | Motozawa et al. | |
| 2001/0033047 A1 | 10/2001 | Beck et al. | |
| 2002/0145315 A1 | 10/2002 | Fraley et al. | |
| 2004/0112659 A1 | 6/2004 | Kramer et al. | |
| 2004/0251097 A1 | 12/2004 | Barbison et al. | |
| 2006/0237885 A1 | 10/2006 | Paillard et al. | |
| 2007/0035167 A1 | 2/2007 | Meyer | |
| 2007/0084687 A1 | 4/2007 | Foster et al. | |
| 2007/0278377 A1 | 12/2007 | Moorhouse et al. | |
| 2008/0156602 A1 | 7/2008 | Hiemenz et al. | |
| 2009/0015051 A1 | 1/2009 | Haeberle | |
| 2009/0134595 A1 | 5/2009 | Haller et al. | |
| 2009/0218867 A1 | 9/2009 | Clark | |
| 2010/0072760 A1 | 3/2010 | Anderson et al. | |
| 2010/0117411 A1 | 5/2010 | Fujita et al. | |
| 2010/0181708 A1 | 7/2010 | Kolb et al. | |
| 2010/0276959 A1 | 11/2010 | Jang | |
| 2011/0001342 A1 | 1/2011 | Deml et al. | |
| 2011/0006567 A1 | 1/2011 | Mullen | |
| 2011/0018316 A1 | 1/2011 | Meredith et al. | |
| 2011/0277433 A1 | 11/2011 | Sugden et al. | |
| 2011/0278894 A1 | 11/2011 | Lorey | |
| 2011/0298266 A1 | 12/2011 | Haller | |
| 2012/0007293 A1 | 1/2012 | Baur et al. | |
| 2012/0025577 A1 | 2/2012 | Kolb | |
| 2012/0091679 A1 | 4/2012 | Kashi et al. | |
| 2012/0091773 A1 | 4/2012 | Lorey | |
| 2012/0145875 A1 | 6/2012 | Haller et al. | |
| 2012/0153689 A1 | 6/2012 | Haller et al. | |
| 2012/0153695 A1 | 6/2012 | Haller et al. | |
| 2013/0112839 A1 | 5/2013 | Kato et al. | |
| 2013/0161138 A1 | 6/2013 | Barefoot | |
| 2013/0341484 A1 | 12/2013 | Yamada et al. | |
| 2014/0239684 A1 | 8/2014 | Mindel | |
| 2014/0354027 A1 | 12/2014 | Kolb | |
| 2015/0001771 A1 | 1/2015 | Lorey | |
| 2015/0090549 A1 | 4/2015 | Haller | |
| 2015/0165933 A1 | 6/2015 | Kolb | |
| 2016/0059658 A1 | 3/2016 | Kuriki | |
| 2017/0023086 A1 | 1/2017 | Ogawa | |
| 2017/0037921 A1 | 2/2017 | Ogawa | |

FOREIGN PATENT DOCUMENTS

| | | |
|---|---|---|
| CN | 101337518 | 1/2009 |
| CN | 203032435 | 7/2013 |
| DE | 1287453 | 1/1969 |
| DE | 2016973 | 10/1970 |
| DE | 2756624 | 6/1979 |
| DE | 2757661 | 6/1979 |
| DE | 141769 | 5/1980 |
| DE | 2059720 | 6/1980 |
| DE | 3517345 | 11/1986 |
| DE | 3517505 | 11/1986 |

(56) References Cited

FOREIGN PATENT DOCUMENTS

| | | |
|---|---|---|
| DE | 3831724 | 3/1990 |
| DE | 3930612 | 3/1991 |
| DE | 4029490 | 3/1992 |
| DE | 4037289 | 5/1992 |
| DE | 3686619 | 4/1993 |
| DE | 4216987 | 7/1993 |
| DE | 3785493 | 10/1993 |
| DE | 19938698 | 2/2001 |
| DE | 20116588 | 5/2002 |
| DE | 10306564 | 8/2004 |
| DE | 102004013308 | 12/2005 |
| DE | 102005040581 | 3/2006 |
| DE | 60116693 | 7/2006 |
| DE | 102005011856 | 8/2006 |
| DE | 102005048949 | 12/2006 |
| DE | 102006016140 | 10/2007 |
| DE | 102007039215 | 2/2009 |
| DE | 202007013300 | 2/2009 |
| DE | 102008016685 | 6/2009 |
| DE | 102008022046 | 7/2009 |
| DE | 102008020865 | 11/2009 |
| DE | 102008027474 | 12/2009 |
| DE | 102008050142 | 3/2010 |
| DE | 102008037547 | 5/2010 |
| DE | 102009022763 | 12/2010 |
| DE | 202011005606 | 12/2011 |
| DE | 102010033419 | 2/2012 |
| DE | 102010037842 | 3/2012 |
| DE | 102010051325 | 5/2012 |
| DE | 102010055342 | 6/2012 |
| DE | 102010055344 | 6/2012 |
| DE | 102011009530 | 7/2012 |
| DE | 102011100307 | 11/2012 |
| DE | 102011085879 | 5/2013 |
| DE | 102014209328 A1 * | 11/2015 ............. B60G 17/08 |
| EP | 0322608 | 7/1989 |
| EP | 1186467 | 3/2002 |
| EP | 1447589 | 8/2004 |
| EP | 1464866 | 10/2004 |
| EP | 1643155 | 4/2006 |
| EP | 2468568 | 4/2006 |
| EP | 2062758 | 5/2009 |
| EP | 2133576 | 12/2009 |
| EP | 2211072 | 7/2010 |
| EP | 2465725 | 6/2012 |
| EP | 2468567 | 6/2012 |
| FR | 1081491 | 12/1954 |
| FR | 1364719 | 6/2012 |
| GB | 459221 A * | 10/1935 ............. B60G 17/08 |
| GB | 1295410 | 11/1972 |
| JP | S62-18346 | 1/1987 |
| JP | S62-18347 | 1/1987 |
| JP | 2013035527 A * | 2/2013 ............. B61F 5/245 |
| WO | WO 91/04168 | 4/1991 |
| WO | WO 94/22692 | 10/1994 |
| WO | WO 99/33676 | 7/1999 |

OTHER PUBLICATIONS

Official Action for U.S. Appl. No. 14/278,098, dated Sep. 9, 2016 10 pages.
Official Action (no translation) for CN Patent Application No. 201410784797.9, dated Jan. 4, 2017, 7 pages.
Official Action for U.S. Appl. No. 14/278,098, dated Mar. 3, 2017 9 pages.
Official Action for U.S. Appl. No. 14/568,374, dated Dec. 20, 2016, 6 pages.
Official Action for U.S. Appl. No. 14/915,754, dated Feb. 2, 2017, 10 pages.
Official Action for U.S. Appl. No. 15/025,986, dated Mar. 20, 2017, 7 pages, Restriction Requirement.
Official Action for European Patent Application No. 14776636.4, dated May 31, 2017, 7 pages.
Official Action for U.S. Appl. No. 15/025,986, dated May 31, 2017 11 pages.
U.S. Appl. No. 14/915,754, filed Mar. 1, 2016, Haller.
U.S. Appl. No. 15/025,986, filed Mar. 30, 2016, Haller
International Search Report and Written Opinion for International (PCT) Patent Application No. PCT/EP2014/070495, dated Dec. 23, 2014, 10 pages.
Notice of Allowance for U.S. Appl. No. 14/276,122, dated Jun. 17, 2015, 9 pages.
Official Action for U.S. Appl. No. 14/294,356, dated Jun. 8, 2015, 15 pages.
Official Action for U.S. Appl. No. 14/294,356, dated Sep. 24, 2015, 17 pages.
Notice of Allowance for U.S. Appl. No. 14/294,356, dated Nov. 30, 2015, 16 pages.
Official Action for U.S. Appl. No. 14/314,719, dated Sep. 30, 2015, 7 pages.
Notice of Allowance for U.S. Appl. No. 14/314,719, dated Mar. 30, 2016 5 pages.
Official Action for U.S. Appl. No. 14/468,977, dated Jul. 21, 2015, 11 pages.
Official Action for U.S. Appl. No. 14/468,977, dated Dec. 4, 2015, 11 pages.
Notice of Allowance for U.S. Appl. No. 14/468,977, dated Mar. 28, 2016 5 pages.

* cited by examiner

PRIOR ART

VEHICLE WITH FORCE-CONTROLLED SHOCK ABSORBER (2-PIPE SHOCK ABSORBER)

CROSS REFERENCE TO RELATED APPLICATIONS

This application is a national stage application under 35 U.S.C. 371 and claims the benefit of PCT Application No. PCT/EP2014/070495 having an international filing date of 25 Sep. 2014, which designated the United States, which PCT application claimed the benefit of German Patent Application No. 10 2013 110 920.9 filed 1 Oct. 2013, the disclosures of each of which are incorporated herein by reference in their entirety.

FIELD

The invention relates to a shock absorber.

A shock absorber of this kind is shown by way of example in FIG. 1. This shock absorber according to the prior art comprises a housing having an inner pipe arranged thereon, a piston rod plunging into the inner pipe, a piston being arranged on the end of said piston rod that plunges into the inner pipe, which piston divides the inside of the inner pipe into a lower chamber and an upper chamber. In this case, a valve arrangement is arranged on the piston, by means of which a working medium received in the inner pipe can flow out of the lower chamber into the upper chamber and vice versa when the piston is moved in the inner pipe. A second valve arrangement is arranged at the upper end of the inner pipe, by means of which, when the piston is moved in the inner pipe, the working medium received in the inner pipe can flow out of the upper chamber only into the inside of the housing serving as a tank for the working medium. Lastly, the inner pipe has a third valve arrangement at its lower end, by means of which the working medium received in the inside of the housing serving as a tank can flow only into the lower chamber of the inner pipe when the piston is moved in the inner pipe.

BACKGROUND

Shock absorbers of this kind according to prior art are usually called 2-pipe shock absorbers. 2-pipe shock absorbers of this kind are used as passive shock absorbers, both as non-adjustable shock absorbers and as adjustable shock absorbers.

In the case of a non-adjustable 2-pipe shock absorber, the properties of the damper or of the damping are clearly defined in such a way that the flow resistance of the working medium is set by the valve arrangements used in the damper.

Adjustable 2-pipe shock absorbers are used when the work to be achieved by the shock absorber is to be adapted to corresponding vehicle states of a vehicle, in which an adjustable 2-pipe shock absorber of this kind is fitted, or to the sprung masses of different sizes. In the case of passive, hydraulically adjustable 2-pipe shock absorbers of this kind, this is achieved in that the flow resistance can be modified by means of a variable valve hole in the valve arrangement arranged on the piston between the upper and the lower chamber of the inner pipe of the damper.

A further feature of passive dampers that are operated in a non-adjustable manner is that the amount of oil exchanged during a defined working stroke is always the same. The flow resistance is dependent only on the speed of the piston inside the inner pipe.

In the case of adjustably operated passive dampers, when the stroke is likewise defined the same, the flow resistance is influenced by the change in the valve cross section of the valve arrangement in the piston, in addition to the speed of the piston. The amount of oil exchanged is likewise the same for a defined stroke.

The mode of operation of a 2-pipe shock absorber of this kind according to the prior art is briefly described below.

When the damper is retracted, the piston moves downwards in the inner pipe so that the lower chamber of the inner pipe decreases in volume, whilst the upper chamber of the inner pipe increases in volume. During this retraction of the damper, a certain amount of oil, functioning here as the working medium, is channeled from the lower chamber into the upper chamber via the valve arrangement of the piston, a defined flow resistance thus being generated across the valve arrangement of the piston by means of the speed thereof. The amount of oil in the upper chamber of the inner pipe that is additionally displaced in the process by the plunging of the piston rod is channeled off into the housing serving as a tank for the working medium or oil respectively via the valve arrangement arranged at upper end of the inner pipe.

If the damper is now withdrawn, the piston moves upwards inside the inner pipe, reducing the volume of the upper chamber and increasing the volume of the lower chamber, the amount of oil or working medium to be exchanged respectively being channeled from the upper chamber into the inside of the housing serving as a tank for the working medium or into the oil sump there respectively via the valve arrangement at the upper end of the inner pipe. The difference in the amount of oil or working medium respectively which is required due to the withdrawal of the piston rod is drawn from the inside of the housing serving as a tank for the working medium or from the oil sump there respectively via the valve arrangement arranged at the bottom of the inner pipe.

As already explained, the working medium or oil respectively moves in a circuit inside the damper.

Since a 2-pipe shock absorber of this kind must be appropriately preassembled according to its use (passive adjustable or passive non-adjustable), it is not possible to use a damper provided in one case for another intended use.

SUMMARY

The object of the invention is therefore that of providing a shock absorber of the type mentioned at the outset, by means of which different intended uses can be realised.

This object is achieved by a shock absorber having the features of claim 1. Advantageous embodiments of the shock absorber according to the invention can be found in the dependent claims.

In addition to the features in the preamble of claim 1, the shock absorber according to the invention also comprises the features that a hydraulic pump drive is arranged between a first connection element of the lower chamber of the inner pipe and a second connection element at the upper chamber of the inner pipe.

By means of the embodiment of the shock absorber according to the invention it is now possible to operate the shock absorber according to the invention in a passive adjustable manner, an active adjustable manner, a semi-active adjustable manner and, by appropriately controlling the hydraulic pump drive, to adaptively operate the control of the flow resistance of the working medium in the valve arrangement of the piston. By means of a hydraulic pump drive of this kind, when moving the piston in the inner pipe in a defined manner, exchanged amounts of working medium or oil respectively can be increased and/or reduced. As a result of this embodiment, it is possible to achieve a level control of the shock absorber in addition to increasing or lowering the damping forces respectively. In particular, an embodiment of this kind can be used for a seat, in particular for a driver's seat of a rail vehicle, for correcting the seat height or alternatively for temporary adjustment.

Shock absorbers of this kind according to the invention can be used not only in wheel suspensions and suspension struts for various vehicles, but rather can also be used to damp vibrations of seats, in particular of sprung vehicle seats and sprung cabs. In addition, a combination of damping a cab suspension and sprung vehicle seats, for example of a rail vehicle, is conceivable. Nor is the use of the shock absorbers according to the invention restricted to uses of this kind, but rather can be used in all possible devices in which a corresponding damping of vibrations is desirable.

Of course, it is also possible to provide a hydraulic pump drive in combination with a valve arrangement, in particular a solenoid valve or a proportional flow control valve, as a device for controlling the flow resistance of the working medium in the valve arrangement of the piston. The advantages and applications described above for the individual devices can thus be used in combination.

Using a solenoid valve makes it possible, for example, to additionally easily achieve two types of damping of the damper in addition to the level control by means of the hydraulic pump drive. In one case, this would be a hard damping, in which the solenoid valve is closed so that the shock absorber according to the invention is still operated as a passive non-adjustable shock absorber. If the solenoid valve is opened, an additional working medium exchange or oil exchange respectively can take place between the upper chamber of the inner pipe and the lower chamber of the inner pipe, so that the flow speed of the working medium is modified by the valve arrangement of the piston and thus softer damping takes place. The shock absorber is thus operated in a passive, non-adjustable manner even when the solenoid valve is open. However, it is possible to switch between hard and soft damping owing to the two possible settings "solenoid valve closed" and "solenoid valve open".

By using a proportional flow valve, it is possible to continuously vary the flow speed in the pressure lines between the upper connection element and the proportional flow control valve and between the lower pressure line and the proportional flow control valve between the completely closed and completely open states of the proportional flow control valve. Adjustable, continuous damping is thus possible, by means of which it is possible to select not only between hard and soft damping, but also between all damping values therebetween.

Furthermore, it has been found to be advantageous for the hydraulic pump drive to comprise a controllable pump and a motor for the pump.

Since, when operating a pump, it is also always necessary to take into account corresponding leakages, in particular when working at high pressures, a leakage pipe for the working medium is provided between the housing serving as a tank for the working medium and the hydraulic pump drive, in particular the controllable pump. A leakage pipe of this kind makes it possible for the working medium or oil respectively from the pump to be returned to the tank so that the working medium consumption or oil consumption respectively of the shock absorber according to the invention is reduced and pollution is prevented.

In particular the use of a controllable pump makes it possible for the pressure stage (when retracting the piston into the shock absorber) and the tension stage (when withdrawing the piston from the shock absorber) to be both separately and synchronously adjustable.

In addition, for pressure compensation, a feed line for the working medium can be provided between the housing serving as a tank for the working medium and the lower pressure line and/or the upper pressure line. In addition, said feed line can be separated from the lower pressure line and/or the upper pressure line by means of non-return valves. However, control valves can also be provided, by means of which the flow and thus the pressure compensation can be controlled.

According to another concept of the invention, it is provided for a rising pipe to be arranged at the upper end of the inner pipe, which rising pipe protrudes into the working medium or oil received in the housing or into the working medium sump or oil sump respectively and by means of which the working medium or oil respectively can be transferred out of the housing serving as a tank into the upper chamber of the inner pipe. Said rising pipe is used in particular to ensure that no cavitation occurs during external operation, in which the amount of working medium or amount of oil respectively can be exchanged between the lower chamber 3 and the upper chamber 4 by means of a hydraulic pump. As a result, the rising pipe ensures a closed oil circuit even when a hydraulic pump is connected to the connection elements of the upper and lower chambers.

Further aims, advantages, features and possible applications of the present invention can be found in the following description of embodiments with reference to the drawings. In this case, all of the features which are described and/or shown in the drawings, in isolation or in any reasonable combination, form the subject matter of the present invention, irrespective of how they are described in the claims and irrespective of the dependency references thereof.

DETAILED DESCRIPTION

Figure 1:
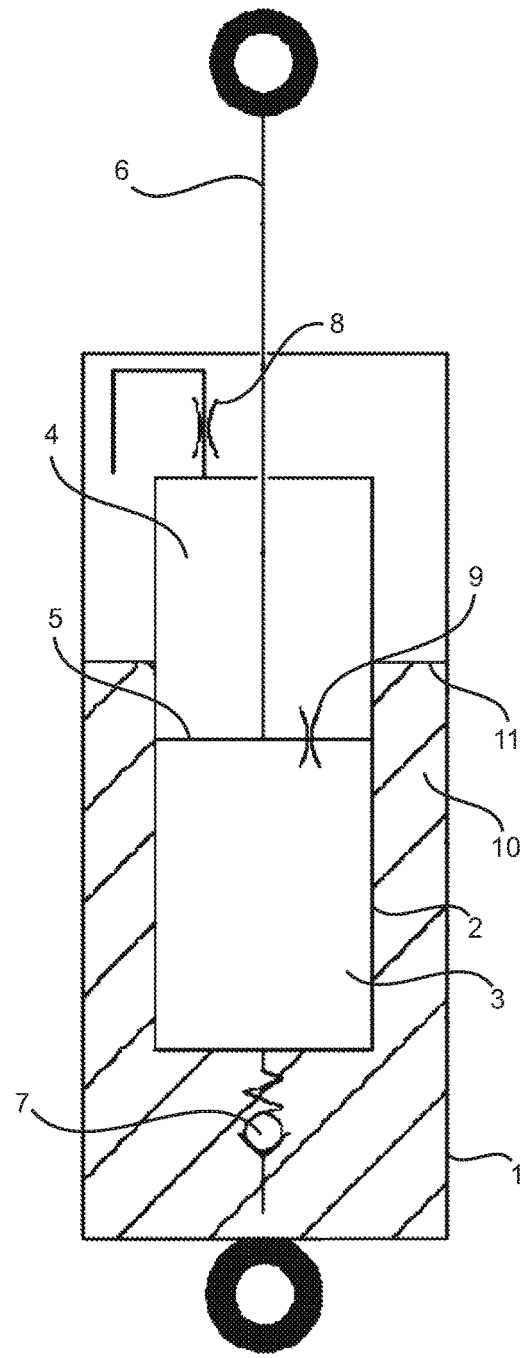
FIG. 1: shows a shock absorber according to the prior art.
Figure 2:
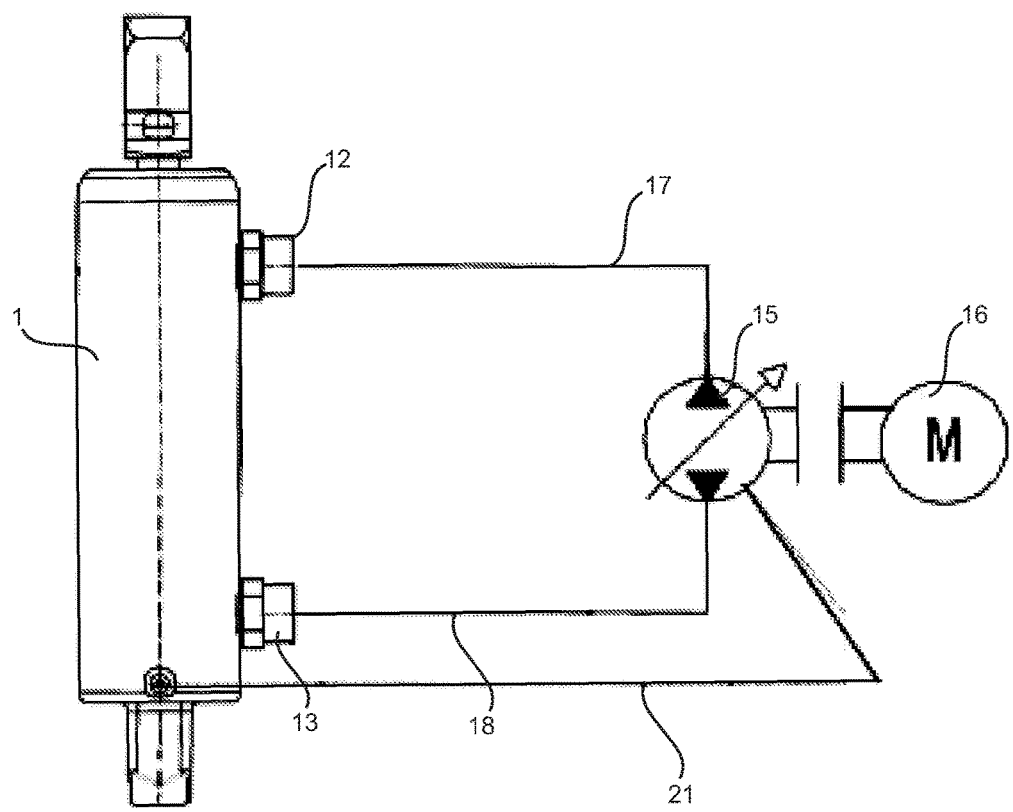
FIG. 2: shows a first embodiment example of a shock absorber according to the invention.
Figure 3:
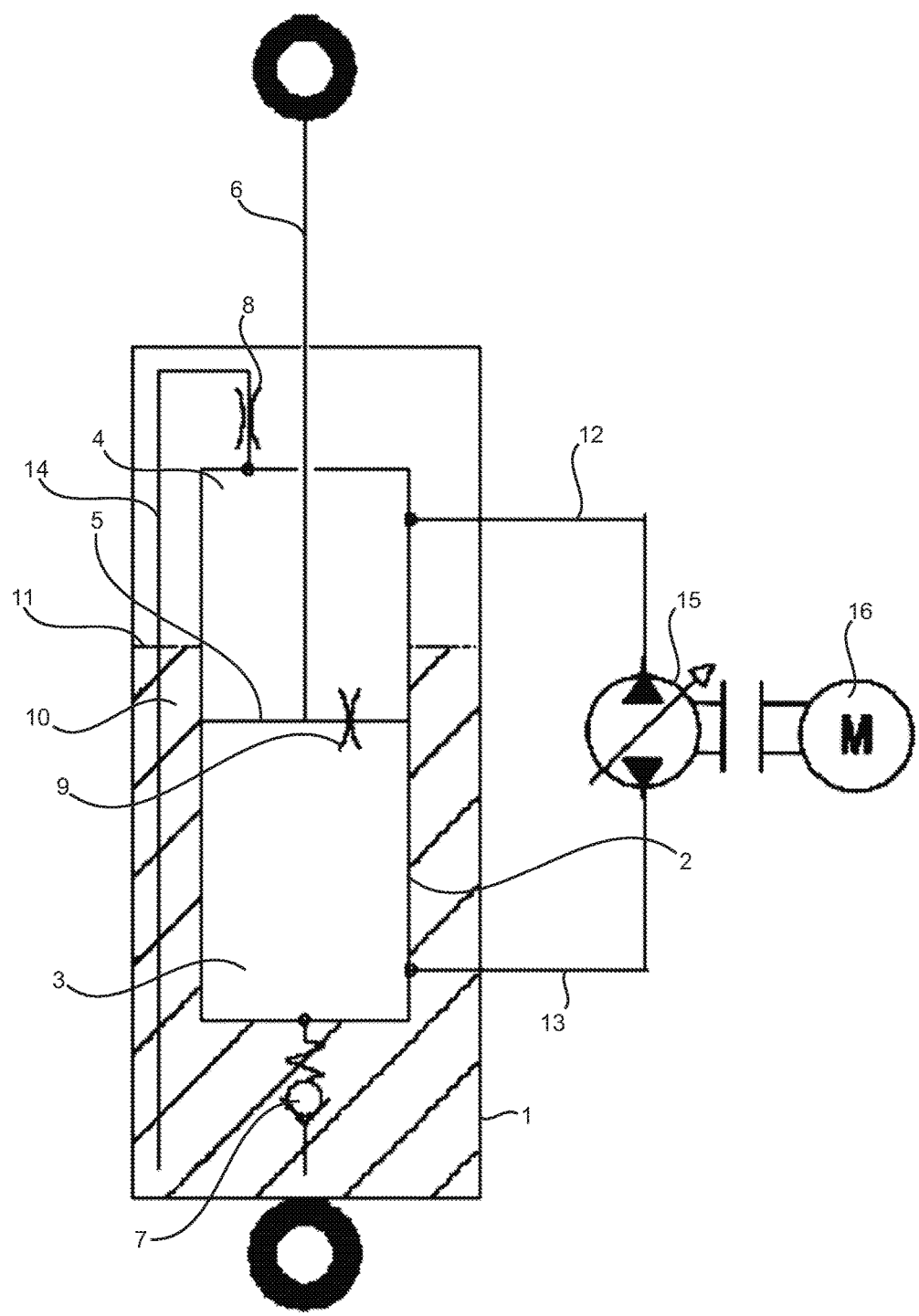
FIG. 3: shows a second embodiment example of a shock absorber according to the invention.

FIG. 2 shows a first embodiment example of a shock absorber according to the invention. The shock absorber basically consists of a housing 1, which is tubular and in which an inner pipe 2 (not shown here) arranged inside the housing (1) is arranged so as to be stationary. In this case, the inside of the housing (1) is formed in principle like that of the prior art according to FIG. 1. A piston 5 can be moved backwards and forwards in the inner pipe 2 by means of a piston rod 6, the inner pipe being separated by the piston 5 into an upper chamber 4 and a lower chamber 3. In this case, the inner pipe 2 is completely filled with a working medium, preferably with an oil. In this case, a first valve arrangement 9 is mounted in the piston 5. Said valve arrangement 9 is designed so that the oil can pass through it in both directions. Since additional oil is displaced when moving the piston 5 in the inner pipe 2 from top to bottom by means of the piston rod 6, the oil must have the opportunity to escape out of the upper chamber 4. For this purpose, a second valve arrangement 8 is provided at the upper end of the inner pipe 2, by means of which valve arrangement oil can escape out of the upper chamber into the container 1 serving as a tank. In this case, the valve arrangement 8 is designed only to allow oil to pass in this direction. It is not possible for oil to pass from the container 1 into the upper chamber 4 of the inner pipe 2 via the valve arrangement 8. Since, when the piston 5 is moved inside the inner pipe 2 from bottom to top, the lower chamber 3 increases in volume whilst the upper chamber decreases in volume, a third valve arrangement 7 is provided at the lower end of the inner pipe 2. It is thus possible for oil to enter into the lower chamber 3 of the inner pipe 2 from the container 1 in which it is stored, whilst, due to the reduced volume of the upper chamber 4, oil found here reaches the container 1 via the valve arrangement 8.

In contrast to the housing from the prior art according to FIG. 1, this embodiment example comprises a connection element 12 on the upper chamber 4 of the inner pipe 2, and a connection element 13 on the lower chamber 3 of the inner pipe 2.

At the connection elements 12 and 13, a hydraulic pump drive is connected to the piston 5 as a device for controlling the flow resistance of the working medium or oil in the valve arrangement 9 respectively.

In the present case, the hydraulic pump drive consists of a controllable pump 15 and a pump motor 16. In this case, the pump 15 is reversible so that it can pump oil out of the lower chamber 3 into the upper chamber 4 of the inner pipe 2 as well as in the opposite direction. By means of a pump 15 of this kind, for a defined stroke of the piston 5 inside the inner pipe 2, amounts of oil exchanged between the lower chamber 3 and the upper chamber 4 can be increased or reduced respectively. On the one hand, this causes the damping forces to be increased/reduced in response to the introduction of the oil; on the other hand, a height correction, in particular a seat height correction can take place in this embodiment example when a damper of this kind is used on a seat, or a temporary adjustment of the shock absorber can be generally carried out.

Since a certain leakage rate must also always be taken into account in pump systems, a leakage pipe 21 is also provided in the embodiment examples according to FIGS. 2 to 5, by means of which oil escaping from the pump 15 can be returned into housing 1 serving as a tank for the oil.

Figure 4:
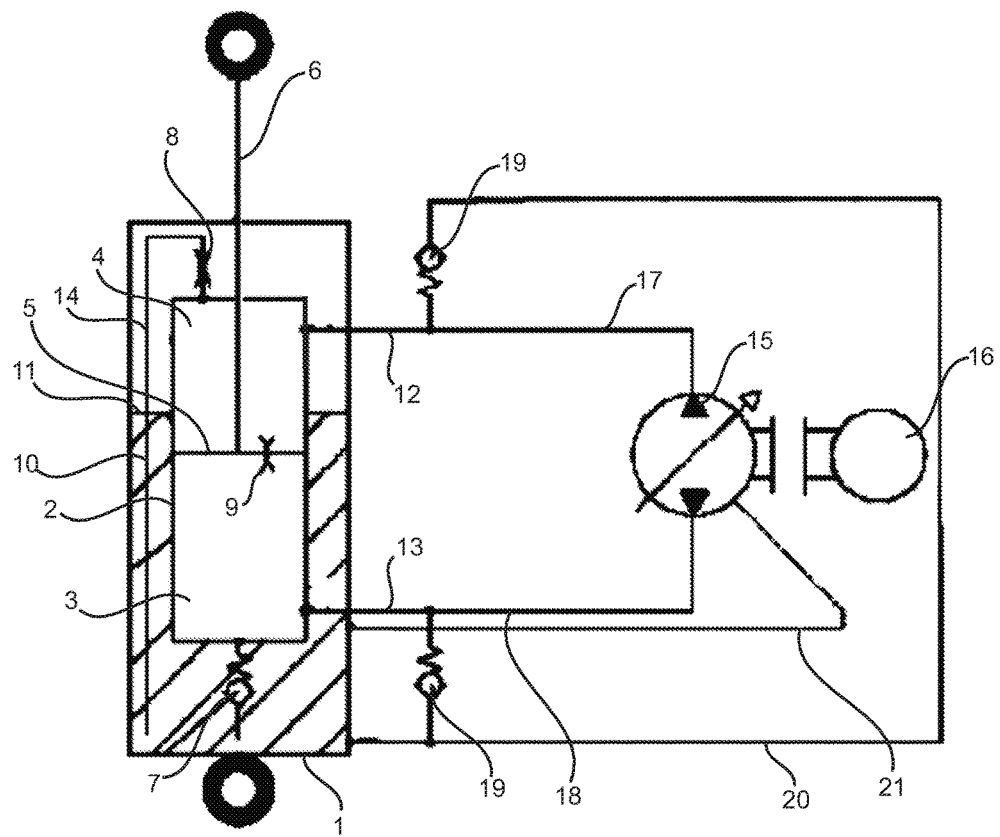
FIG. 4: shows a third embodiment example of a shock absorber according to the invention.
Figure 5:
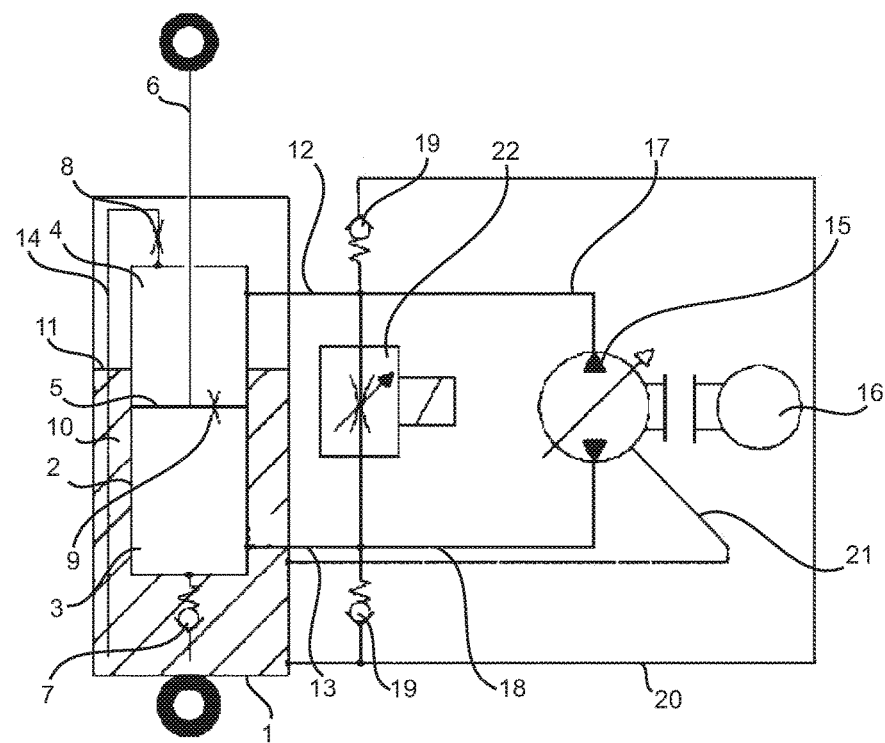
FIG. 5: shows a fourth embodiment example of a shock absorber according to the invention.

In addition, the embodiment examples in FIGS. 4 and 5 comprise a feed line 20, by means of which the pump 15 can be supplied with any necessary amount of feed oil during operation. In this case said feed line 20 comprises connections to the pressure lines 17 and 18, said pressure lines being separated from one another by means of non-return valves or control valves 19 respectively which are used for flow rate compensation or pressure compensation respectively.

FIG. 5 shows a further embodiment example of a shock absorber according to the invention. In addition to the above-described hydraulic pump drive, a proportional flow control valve is provided here in parallel with said pump drive on the pressure lines 17 and 18 as a device for controlling the flow resistance of the working medium in the valve arrangement 9 of the piston 5, which proportional flow control valve is arranged between a pressure line 18 connected at the lower connection element 13 and a pressure line 17 connected at the upper connection element 14. By means of a proportional flow control valve 22 of this kind, it is possible to control the flow resistance of the oil therein according to the flow strength. In this respect it is hereby possible to adjust the performance of the shock absorber and thus the damping according to the required loading conditions by means of said proportional flow control valve 22. A passive default setting of the shock absorber is provided here as a hard setting, the shock absorber achieving its highest performance in this flowless state. When the proportional flow control valve 22 is activated, the damping forces are reduced, since a certain proportion of the oil exchange between the chamber 3 and the chamber 4 is diverted through the pressure lines 17 and 18 and the proportional flow control valve 22, without flowing through the hydraulic pump arrangement. The stronger the flow, the more oil can flow through the proportional flow control valve, so that the shock absorber is adjusted to be softer as the flow strength increases. The shock absorber can therefore be operated both semi-actively and passively.

In addition, all the embodiment examples in FIGS. 2 to 5 comprise a rising pipe 14 arranged on the upper end of the inner pipe 2, which rising pipe protrudes through an oil sump level 11 into the oil sump 10 inside the container 1. Said rising line 14 is used to ensure that no cavitation occurs during external operation of the shock absorber, in which the amount of oil is exchanged between the lower chamber 3 and the upper chamber 4 by means of a hydraulic pump. Cavitation of this kind would be disadvantageous for the operation of the shock absorber. In addition, said rising pipe 14 ensures a closed oil circuit even during external operation.

Figure 6:
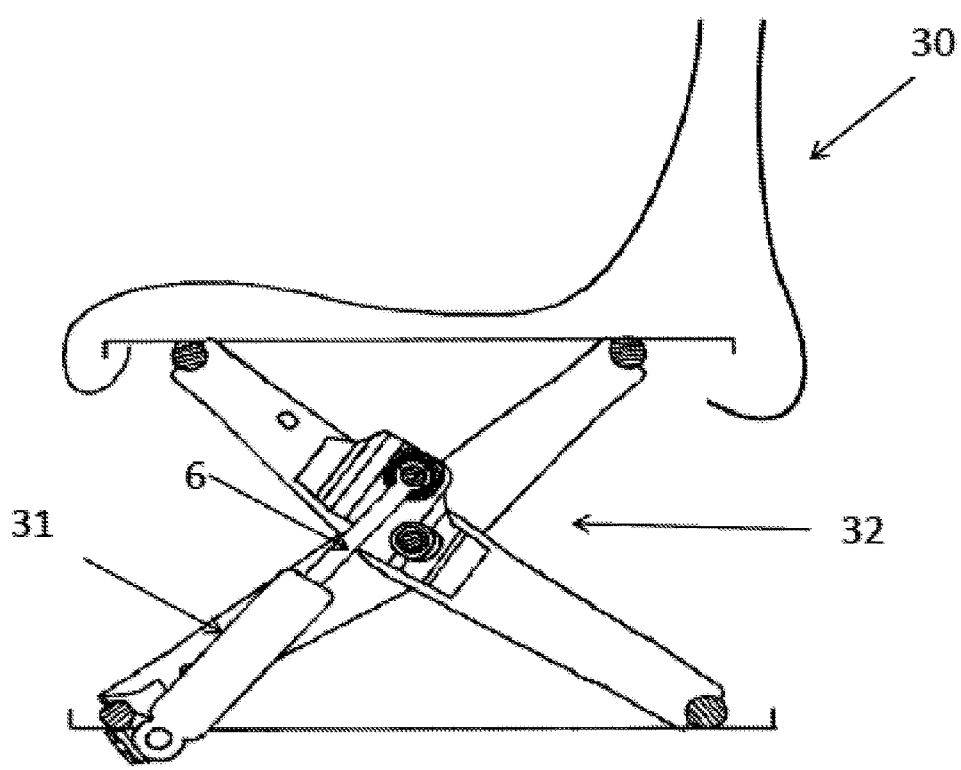
FIG. 6: shows a vehicle seat equipped with a suspension, in which a shock absorber according to the invention is fitted.

A vehicle seat 30 is shown in FIG. 6, which has suspension 32, the vibrations of which are damped by means of a shock absorber 31 according to the invention.

LIST OF REFERENCE NUMERALS

1 Housing
2 Inner pipe
3 Chamber
4 Chamber
5 Piston
6 Piston rod
7 Valve arrangement
8 Valve arrangement
9 Valve arrangement
10 Oil sump
11 Oil sump level
12 Connection element
13 Connection element
14 Rising pipe
15 Pump
16 Motor
17 Pressure line
18 Pressure line
19 Non-return valve
20 Feed line
21 Leakage pipe
22 Proportional flow control valve

The invention claimed is:
1. A shock absorber comprising:
a) a housing;
b) an inner pipe arranged in the housing;
c) a piston rod that plunges into the inner pipe;

d) a piston arranged on the end of the piston rod that plunges into the inner pipe, which piston divides the inside of the inner pipe into a lower chamber and an upper chamber;

e) a first valve arrangement arranged on the piston, by means of which a working medium received in the inner pipe can flow out of the lower chamber into the upper chamber and vice versa when the piston is moved in the inner pipe;

f) a second valve arrangement arranged at the upper end of the inner pipe, by means of which, when the piston is moved in the inner pipe, the working medium received in the inner pipe can flow out of the upper chamber only into the inside of the housing serving as a tank for the working medium; and g) a third valve arrangement arranged at the lower end of the inner pipe, by means of which the working medium received in the inside of the housing serving as a tank can flow out of the inside of the housing serving as a tank only into the lower chamber when the piston is moved in the inner pipe, wherein a hydraulic pump drive is arranged between a first connection element of the lower chamber of the inner pipe and a second connection element at the upper chamber of the inner pipe, and wherein a leakage pipe for the working medium is provided between the housing serving as a tank for the working medium and the hydraulic pump drive.

2. The shock absorber according to claim 1, wherein the hydraulic pump drive is connected to the lower and the upper connection element by means of pressure lines.

3. The shock absorber according to claim 1, wherein a valve arrangement, in particular a solenoid valve or a proportional flow control valve, is provided for controlling the flow resistance of the working medium in the first valve arrangement, said valve arrangement being arranged between a pressure line connected at the lower connection element and a pressure line connected at the upper connection element.

4. The shock absorber according to claim 1, wherein the hydraulic pump drive comprises a controllable pump and a motor for the pump.

5. The shock absorber according to claim 2, wherein a feed line for the working medium is provided between the housing serving as a tank for the working medium and at least one of the lower pressure line and the upper pressure line.

6. The shock absorber according to claim 5, wherein a non-return valve or a control valve respectively is arranged between the feed line and at least one of the lower pressure line and the upper pressure line.

7. The shock absorber according to claim 1, wherein a rising pipe is arranged at the upper end of the inner pipe, which rising pipe protrudes into the working medium received in the housing and by means of which working medium can be transferred from the housing serving as a tank into the upper chamber of the inner pipe.

8. The shock absorber according to claim 1, wherein the hydraulic pump drive comprises a controllable pump and a motor for the pump.

9. A shock absorber comprising:

a) a housing;

b) an inner pipe arranged in the housing;

c) a piston rod that plunges into the inner pipe;

d) a piston arranged on the end of the piston rod that plunges into the inner pipe, which piston divides the inside of the inner pipe into a lower chamber and an upper chamber;

e) a first valve arrangement arranged on the piston, by means of which a working medium received in the inner pipe can flow out of the lower chamber into the upper chamber and vice versa when the piston is moved in the inner pipe;

f) a second valve arrangement arranged at the upper end of the inner pipe, by means of which, when the piston is moved in the inner pipe, the working medium received in the inner pipe can flow out of the upper chamber only into the inside of the housing serving as a tank for the working medium; and g) a third valve arrangement arranged at the lower end of the inner pipe, by means of which the working medium received in the inside of the housing serving as a tank can flow out of the inside of the housing serving as a tank only into the lower chamber when the piston is moved in the inner pipe, wherein a hydraulic pump drive is arranged between a first connection element of the lower chamber of the inner pipe and a second connection element at the upper chamber of the inner pipe, wherein the hydraulic pump drive is connected to the lower and the upper connection element by means of pressure lines, and wherein a feed line for the working medium is provided between the housing serving as a tank for the working medium and at least one of the lower pressure line and the upper pressure line.

10. The shock absorber according to claim 9, wherein a non-return valve or a control valve respectively is arranged between the feed line and at least one of the lower pressure line and the upper pressure line.

11. The shock absorber according to claim 9, wherein a valve arrangement, in particular a solenoid valve or a proportional flow control valve, is provided for controlling the flow resistance of the working medium in the first valve arrangement, said valve arrangement being arranged between a pressure line connected at the lower connection element and a pressure line connected at the upper connection element.

12. A shock absorber comprising:

a) a housing;

b) an inner pipe arranged in the housing;

c) a piston rod that plunges into the inner pipe;

d) a piston arranged on the end of the piston rod that plunges into the inner pipe, which piston divides the inside of the inner pipe into a lower chamber and an upper chamber;

e) a first valve arrangement arranged on the piston, by means of which a working medium received in the inner pipe can flow out of the lower chamber into the upper chamber and vice versa when the piston is moved in the inner pipe;

f) a second valve arrangement arranged at the upper end of the inner pipe, by means of which, when the piston is moved in the inner pipe, the working medium received in the inner pipe can flow out of the upper chamber only into the inside of the housing serving as a tank for the working medium;

g) a third valve arrangement arranged at the lower end of the inner pipe, by means of which the working medium received in the inside of the housing serving as a tank can flow out of the inside of the housing serving as a tank only into the lower chamber when the piston is moved in the inner pipe, wherein a hydraulic pump drive is arranged between a first connection element of the lower chamber of the inner pipe and a second connection element at the upper chamber of the inner pipe, wherein a rising pipe is arranged at the upper end of the inner pipe, which rising pipe protrudes into the working medium received in the housing and by means of which working medium can be transferred from the housing serving as a tank into the upper chamber of the inner pipe.

13. The shock absorber according to claim 12, wherein the hydraulic pump drive is connected to the lower and the upper connection element by means of pressure lines.

14. The shock absorber according to claim 13, wherein a feed line for the working medium is provided between the housing serving as a tank for the working medium and at least one of the lower pressure line and the upper pressure line.

15. The shock absorber according to claim 12, wherein a valve arrangement, in particular a solenoid valve or a proportional flow control valve, is provided for controlling the flow resistance of the working medium in the first valve arrangement, said valve arrangement being arranged between a pressure line connected at the lower connection element and a pressure line connected at the upper connection element.

16. The shock absorber according to claim 12, wherein the hydraulic pump drive comprises a controllable pump and a motor for the pump.

17. The shock absorber according to claim 12, wherein a non-return valve or a control valve respectively is arranged between the feed line and at least one of the lower pressure line and the upper pressure line.

* * * * *